(12) United States Patent
Liu et al.

(10) Patent No.: US 9,835,790 B2
(45) Date of Patent: Dec. 5, 2017

(54) LIGHT GUIDE DEVICE AND ELECTRONIC DEVICE WITH LIGHT GUIDE DEVICE

(71) Applicants: SHENZHEN FUTAIHONG PRECISION INDUSTRY CO., LTD., Shenzhen (CN); FIH (HONG KONG) LIMITED, Kowloon (HK)

(72) Inventors: Su-Tzong Liu, New Taipei (TW); Sheng-Ying Liu, Shenzhen (CN); Wei-Rong Xiao, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 250 days.

(21) Appl. No.: 14/790,783

(22) Filed: Jul. 2, 2015

(65) Prior Publication Data

US 2016/0313497 A1    Oct. 27, 2016

(30) Foreign Application Priority Data

Apr. 27, 2015  (CN) .......................... 2015 1 0203844

(51) Int. Cl.
*G03B 15/02*    (2006.01)
*F21V 8/00*     (2006.01)
(Continued)

(52) U.S. Cl.
CPC ......... *G02B 6/0073* (2013.01); *G02B 6/0031* (2013.01); *G02B 6/0068* (2013.01);
(Continued)

(58) Field of Classification Search
CPC .. G02B 6/0073; G02B 6/0031; G02B 6/0068; G01D 3/00; G12B 11/00; G03B 15/03; G03B 15/06; G03B 15/05; G03B 15/0426; G03B 2215/0582; G03B 2215/0503; G03B 2215/056; G03B 2215/0567; G03B 2215/0589; G03B 2215/0596; H05B 33/0815
(Continued)

(56) References Cited

U.S. PATENT DOCUMENTS

| | | | |
|---|---|---|---|
| 8,089,451 B2 * | 1/2012 | Furuta .................... | G02B 6/002 345/102 |
| 8,373,822 B2 * | 2/2013 | Hashimoto ............ | G02B 6/002 349/62 |

(Continued)

*Primary Examiner* — Elmito Breval
*Assistant Examiner* — Omar Rojas Cadima
(74) *Attorney, Agent, or Firm* — Steven Reiss

(57) ABSTRACT

A light guide device is provided. The light guide device includes a light guide member and a reflective member. The light guide member includes a junction surface, a first light incident member, a second light incident member, a contact surface, and a reflective curve surface. The reflective member includes a reflective surface adapted to the reflective curved surface and the contact surface of the light guide member. The first light receiving member and the second light receiving member respectively aligned to a first light-emitting element and a second light-emitting element, and are used to receive light emitted by the first light-emitting element and the second light-emitting element and guide the received light out.

7 Claims, 7 Drawing Sheets

(51) Int. Cl.
   *G03B 15/05* (2006.01)
   *H05B 33/08* (2006.01)
(52) U.S. Cl.
   CPC ......... *G03B 15/05* (2013.01); *H05B 33/0815*
         (2013.01); *G03B 2215/0582* (2013.01)
(58) Field of Classification Search
   USPC .......................... 362/11, 12, 3, 23.01, 23.08
   See application file for complete search history.

(56) References Cited

U.S. PATENT DOCUMENTS

| | | | |
|---|---|---|---|
| 2003/0043314 A1* | 3/2003 | Lee ..................... | G02B 6/0065 |
| | | | 349/65 |
| 2006/0146573 A1* | 7/2006 | Iwauchi ............... | G02B 6/0018 |
| | | | 362/621 |
| 2010/0208333 A1* | 8/2010 | Omote ............... | G02F 1/133308 |
| | | | 359/320 |
| 2012/0250313 A1* | 10/2012 | Shimizu ............ | G02F 1/133615 |
| | | | 362/235 |
| 2015/0280767 A1* | 10/2015 | Ames ..................... | B23K 26/10 |
| | | | 455/575.8 |

\* cited by examiner

US 9,835,790 B2

LIGHT GUIDE DEVICE AND ELECTRONIC DEVICE WITH LIGHT GUIDE DEVICE

This application claims priority to Chinese Patent Application No. 201510203844.0 filed on Apr. 27, 2015, the contents of which are incorporated by reference herein.

FIELD

The subject matter herein generally relates to a light guide device and an electronic device with the light guide device.

BACKGROUND

Electronic devices, such as mobile phones and tablet computers can be equipped with a front camera and a front flash located on a front panel of the electronic device. The front camera can be configured to take a photo or a video of a user who is facing the display screen. Additionally, the inclusion of a flash assists in taking a better image in law light conditions.

BRIEF DESCRIPTION OF THE DRAWINGS

Implementations of the present technology will now be described, by way of example only, with reference to the attached figures.

DETAILED DESCRIPTION

Figure 1:
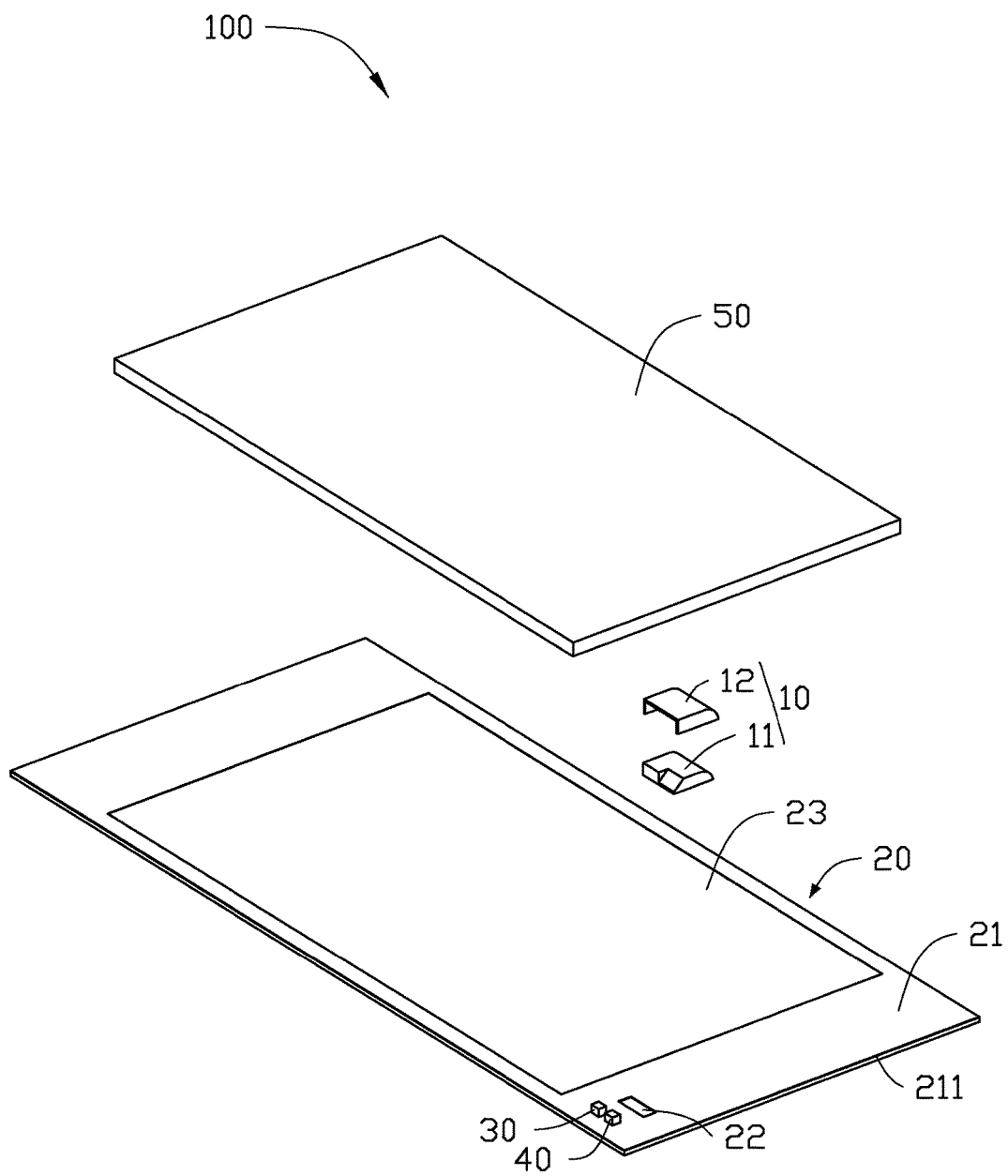
FIG. 1 is an exploded view of a portion of components of an electronic device from a first angle according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

FIG. 1 illustrates an exploded view of a portion of components of an electronic device 100 from a first angle. In the illustrated embodiment, the first angle is an angle which shows an inverted placement of the electronic device 100. The electronic device 100 includes a light guide device 10, a glass cover plate 20, a first light emitting element 30, and a second light emitting element 40. The glass cover plate 20 includes a non-display area 21 formed on an inner surface of the glass cover plate 20. The light guide device 10, the first light emitting element 30, and the second light emitting element 40 are all set at the non-display area 21 of the inner surface of the glass cover plate 20. The glass cover plate 20 further includes a decorative coating which is coated on the entirety of the non-display area 21 except a portion corresponding to the light guide device 10. The decorative coating can be a silver coating, a white coating, a black coating or any other coating that blocks at least some light. The portion corresponding to the light guide device 10 of the non-display area 21 forms a light transmission member 22.

As shown in FIG. 1, the electronic device 100 further includes a touch screen 50. The touch screen 50 is fixed on a display area 23 of the inner surface of the glass cover plate 20, and is used to provide touch input and display function.

Figure 2:
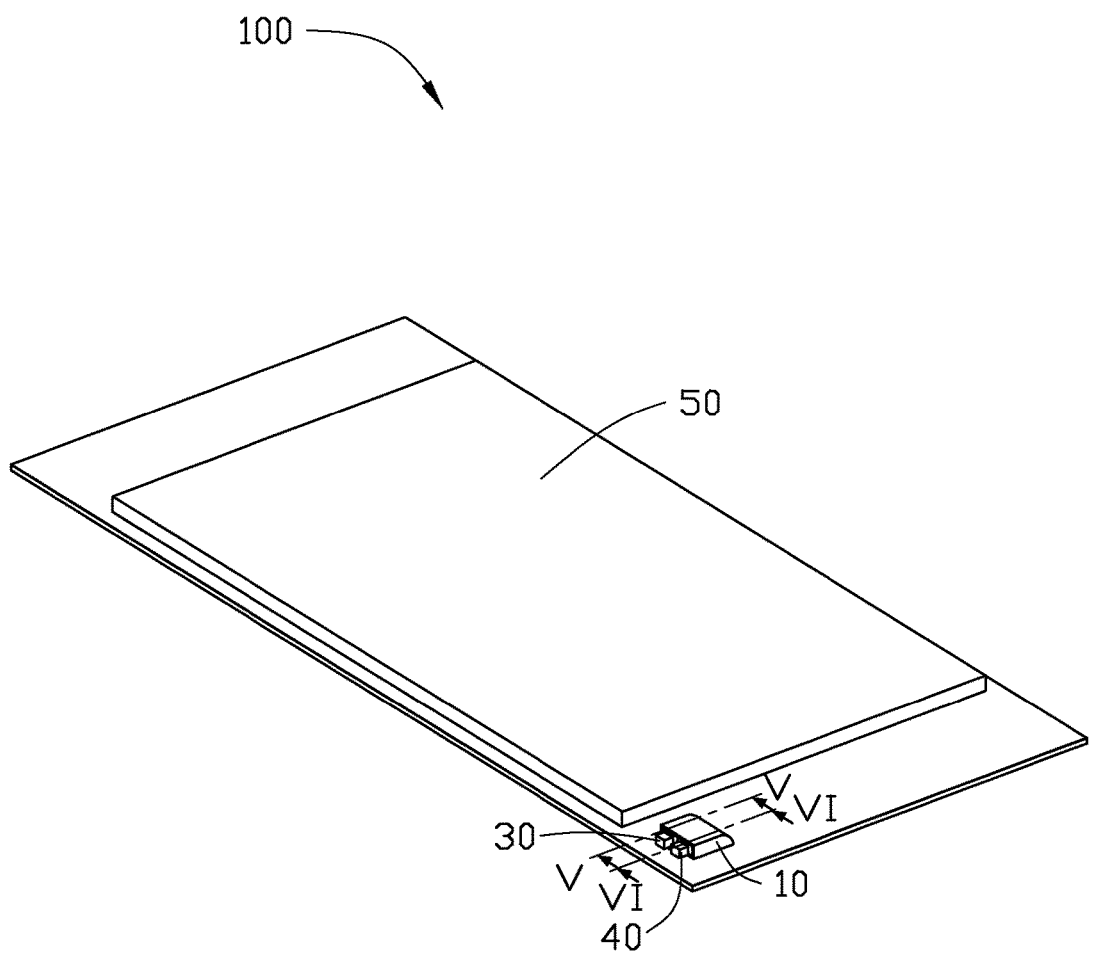
FIG. 2 is an integrated view of a part of components of an electronic device from a first angle according to an exemplary embodiment.

Referring also to FIG. 2, the first light emitting element 30 and the second light emitting element 40 are aligned with the light guide device 10.

Figure 3:
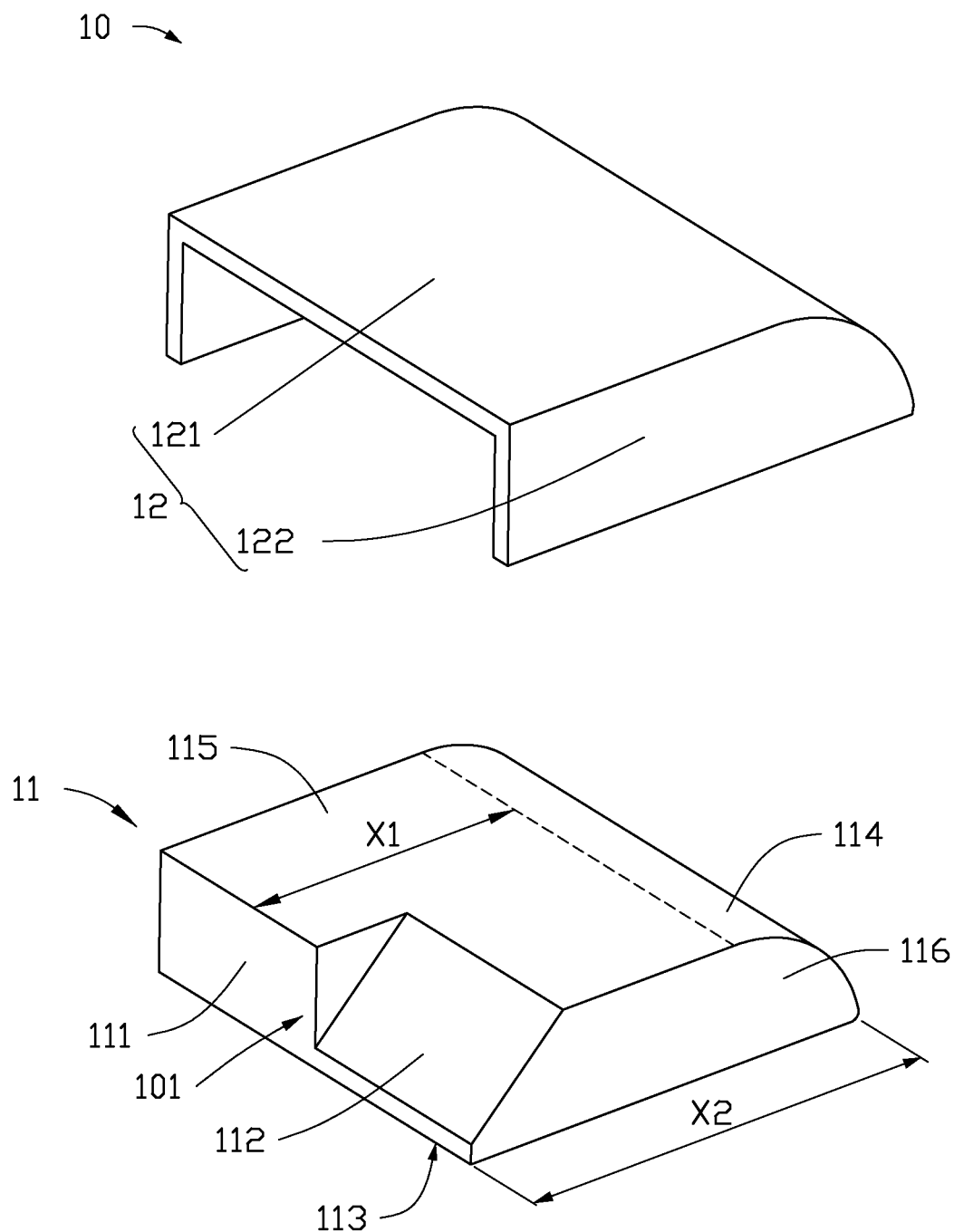
FIG. 3 is an exploded view of a light guide device from a first angle according to an exemplary embodiment.

Referring also to FIG. 3, the light guide device 10 includes a light guide member 11 and a reflective member 12. The light guide member 11 includes a first light incident member 111, a second light incident member 112, a junction surface 113, a reflective curved surface, and a contact surface 115. The light guide device 10 is fixed on the portion, corresponding to the light transmission member 22, of the inner surface of the glass cover plate 20 via the junction surface 113. In one embodiment, a size of the light transmission member 22 can have a size that is less than or equal to a size of the junction surface 113.

The first light incident member 111 is a surface at a first side 101 of the light guide device 10 and perpendicular to the junction surface 113. The second light incident member 112 is another surface at the first side 101 of the light guide device 10 and is oriented slantwise relative to the junction surface 113. In the illustrated embodiment, the second light incident member 112 is slantwise relative to the junction surface 113 and extend from the junction surface 113 to the contact surface 115. The contact surface 115 is parallel to the junction surface 113, and the contact surface 115 has a length X1 that is less than a length X2 of the junction surface 113. The reflective curved surface 114 is an arc-shaped surface formed between an end of the contact surface 115 and an end of the junction surface 113 of a second side of the light guide device 10.

The reflective member 12 is a cover structure adapted to the light guide device 11. The reflective member 12 includes a reflective surface 121 adapted to the reflective curved surface 114 and the contact surface 115 of the light guide member 11. One portion of the reflective surface 121 is a curved surface adapted to the reflective curved surface 114 and another portion of the reflective surface 121 is a plane surface adapted to the contact surface 115.

Figure 4:
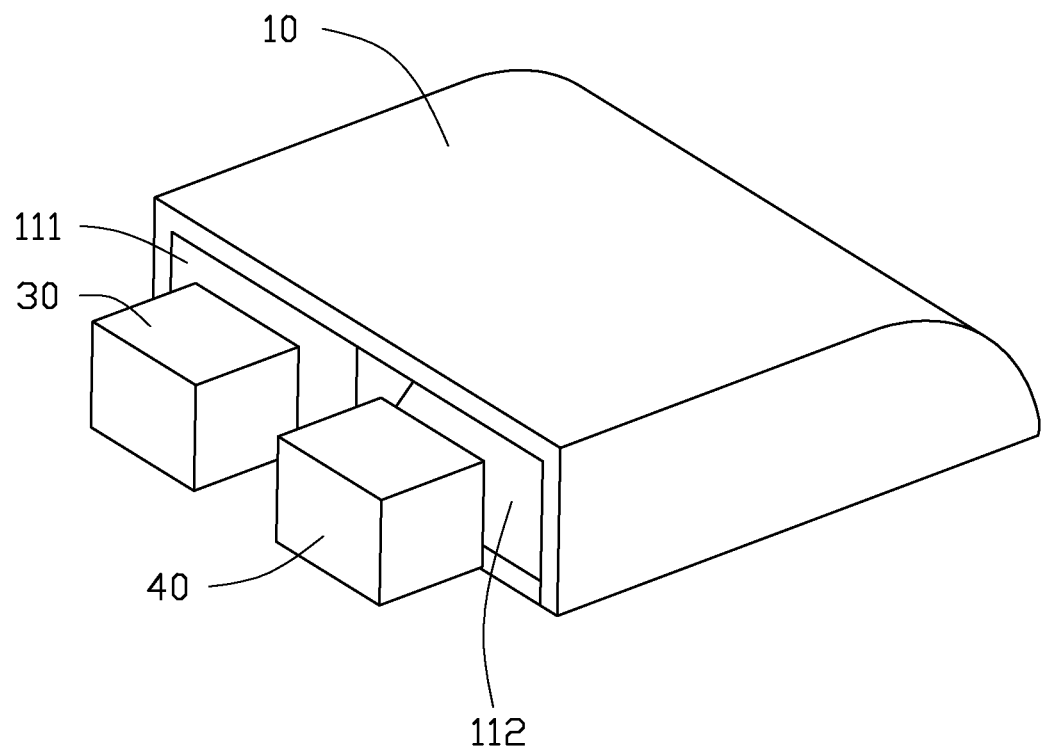
FIG. 4 is an integrated view of a light guide device from a first angle according to an exemplary embodiment.

FIG. 4 illustrates when the reflective member 12 is fixed on the light guide member 11, the first light incident member 111, the second light incident member 112 are exposed and not covered by the reflective member 12. A position of the first light emitting element 30 corresponds to the first light incident member 111, and a position of the second light emitting element 40 corresponds to the second light incident member 112. Light transmission directions of the first light emitting element 30 and the second light emitting element 40 are respectively aimed at the first light incident member 111 and the second light incident member 112.

Referring back to FIG. 3, in one embodiment, the reflective member 12 further includes two reflective sidewalls 122. The reflective sidewalls 122 are respectively adapted to two sidewalls 116 of the light guide member 11 by adhesive or other methods. The two reflective sidewalls 122 are used to enhance a reflective effect of the reflective member 12. In other embodiments, the two reflective sidewalls 122 can be omitted.

In one embodiment, a color of the reflective member 12 is the same as the color of the decorative coating 211, for example, the color of the reflective member 12 and the decorative coating 211 can be silver, white, black, or other colors. Therefore, if the first light emitting element 30 and the second light emitting element 40 do not emit light, the light transmission member 22 is hid and is difficult to be found by a user of the electronic device 100, the aspect of the electronic device 100 is not affected accordingly. In one embodiment, the whole of the reflective member 12 and the two reflective sidewalls 122 with the same color as the decorative coating 211 are made of reflective material, such as silver material. In another embodiment, one surface of the reflective member 12 is coated with a reflective material coating and one surface of each reflective sidewalls 122 is also coated with the reflective material coating, and the color of the reflective material coating is the same as that of the decorative coating 211.

In one embodiment, the light guide member 11 is made of a transparent material with high optical transmittance, such as transparent glass, transparent plastic, or the like.

In one embodiment, the reflective member 12 is fixed on the light guide member 11 via adhesive. In another embodiment, the reflective member 12 and the light guide member 11 can be an integrated structure.

Figure 5:
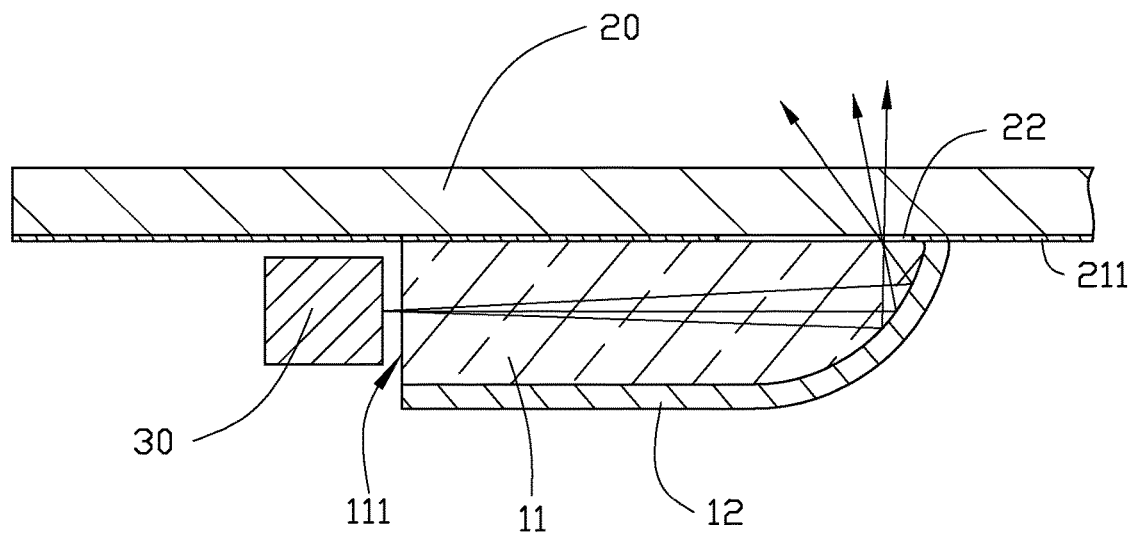
FIG. 5 shows an inverted angle of a cross-sectional view of the electronic device of FIG. 2 along lines V-V of FIG. 2.

FIG. 5 illustrates an inverted angle of a cross-sectional view of the electronic device 100 of FIG. 2 along lines V-V, and also shows an effect of light emitted by the first light emitting element 30 and guided by the light guide device 10. Namely, FIG. 5 is a cross-sectional view of the electronic device of FIG. 2 along lines V-V of FIG. 2 front a second angle. The second angle is an inverted angle of the first angle, namely the second angle shows an non-inverted placement of the electronic device 100. The light transmission direction of the first light emitting element 30 is aimed at the first light incident member 111 of the light guide member 11, when the first light emitting element 30 emits light, the light emitted by the first light emitting element 30 is transmitted to the reflective curved surface 114 of the light guide member 11 via the first light incident member 11 and is reflected by a portion of the reflective member 12 covering the reflective curved surface 114 of the light guide member 11. Then the light is emitted out via the light transmission member 22 of the glass cover plate 20. The light emitted out via the light transmission member 22 of the glass cover plate 20 can be used as flash. Because the light is reflected by the portion of the reflective member 12 covering the reflective curved surface 114 by a diffusing reflection mode, the light emitted out via the light transmission member 22 of the glass cover plate 20 is soft. In another embodiment, the shape of the reflective curved surface 114 can be adjusted to generate the light with different effects. For example, the reflective curved surface 114 can be instead an incline planner surface, and the light emitted out via the light transmission member 22 of the glass cover plate 20 is strong.

Figure 6:
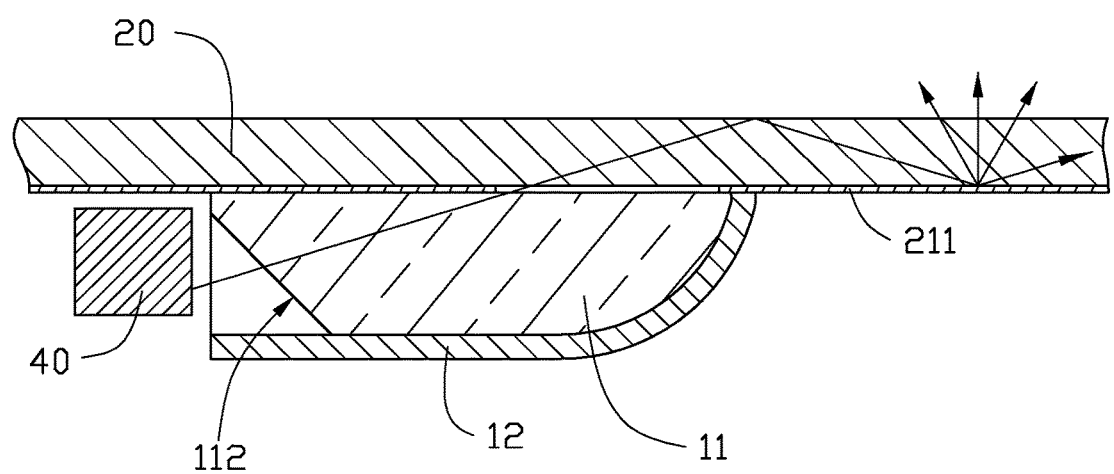
FIG. 6 shows an inverted angle of a cross-sectional view of the electronic device of FIG. 2 along lines VI-VI of FIG. 2.

FIG. 6 illustrates an inverted angle of a cross-sectional view of the electronic device of FIG. 2 along lines VI-VI, and also shows an effect of light emitted by the second light emitting element 40 and guided by the light guide device 10 of the light guide device 10. Namely, FIG. 6 is a cross-sectional view of the electronic device of FIG. 2 along lines VI-VI of FIG. 2 front the second angle, which shows an non-inverted placement of the electronic device 100. The light transmission direction of the second light emitting element 40 is aimed to the second light incident member 112 of the light guide member 11, when the second light emitting element 40 emits light, the light emitted by the second light emitting element 40 is refracted when passing through the second light incident member 112, and then, the light is emitted out via the light transmission member 22 of the glass cover plate 20 to an upper surface of the glass cover plate 20. Incident angles of the light emitted to the upper surface of the glass cover plate 20 are greater than a refraction critical angle. Light emitted to the upper surface of the glass cover plate 20 is diffused in the glass cover plate 20 via a total internal reflection mode. The light diffused in the glass cover plate 20 is reflected via the decorative coating 211 causing a luminous area of the glass cover plate 20 to be formed and function as an indication signal. For example, the entirety surface of the glass cover plate 20 would emit light as the indication signal to indicate an occurrence of a preset event. The preset event can be an event of receiving a short message, an event of an incoming call, or the like.

The glass cover plate 20 is made of transparent and conductive material, such as indium tin oxide.

Figure 7:
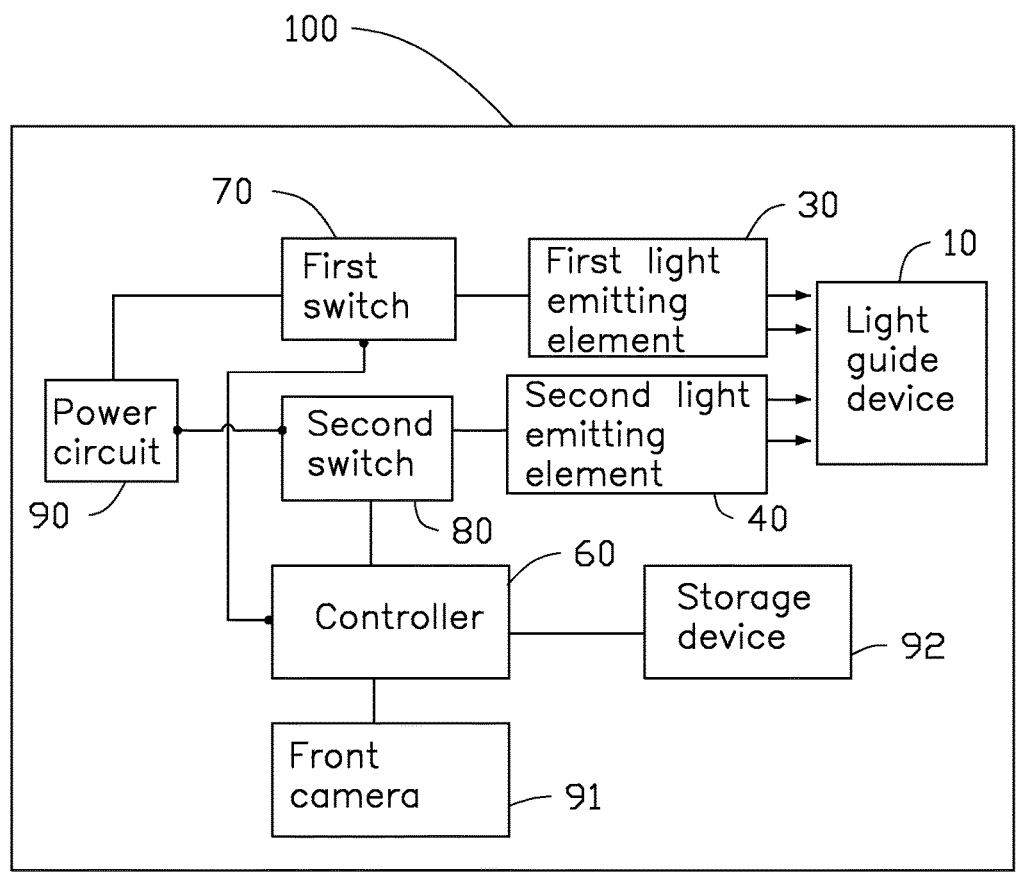
FIG. 7 is a circuit diagram of a part of components of an electronic device according to an exemplary embodiment.

FIG. 7 illustrates a circuit diagram of a part of components of the electronic device 100. The electronic device 100 further includes a controller 60, a first switch 70, a second switch 80, a power circuit 90, and a front camera 91. The power circuit 90 is used to provide a power voltage and can be a battery, a battery packet, or an adapter port for connecting a power adapter.

The first switch 70 is connected between the first light emitting element 30 and the power circuit 90 and is used to establish or cut off a connection between the first light emitting element 30 and the power circuit 90. The second switch 80 is connected between the second light emitting element 40 and the power circuit 90, and is used to establish or cut off a connection between the second light emitting element 40 and the power circuit 90.

The controller 60 is connected to the first switch 70 and the second switch 80, and is used to turn on or turn off the first switch 70 and the second switch 80. In one embodiment, the controller 60 only controls the first switch 70 to turn on in response to an operation of turning on the front camera 91. When the first switch 70 is turned on, the power circuit 90 provides the power voltage to the first light emitting element 30, thus causing the first light emitting element 30 to emit light. As described above, when the first light emitting element 30 emits light, the light emitted by the first light emitting element 30 is transmitted to the reflective curved surface 114 of the light guide member 11 via the first light incident member 11 and is reflected by a portion of the reflective member 12 covering the reflective curved surface 114 of the light guide member 11. Then the light is emitted out via the light transmission member 22 of the glass cover plate 20 as the flash.

The controller 60 only controls the second switch 80 to turn on in response to an occurrence of an event. When the second switch 80 is turned on, the power circuit 90 provides the power voltage to the second light emitting element 40 to cause the second light emitting element 40 to emit light. As described above, when the second light emitting element 40 emits light, the light emitted by the second light emitting element 40 is refracted when passing through the second light incident member 112 and then is emitted out via the light transmission member 22 of the glass cover plate 20 to an upper surface of the glass cover plate 20. Then the light is diffused in the glass cover plate 20 via a total internal reflection mode causing a luminous area of the glass cover plate 20 to be formed and function as the indication signal. Therefore, the indication signal can indicate the occurrence of the preset event, such as the event of receiving a short message, the event of incoming call, or the like.

In one embodiment, the first switch 70 and the second switch 80 can be metal-oxide semiconductor field effect transistors (MOSFETs), bipolar junction transistors (BJTs), or the like. The controller 60 includes a first signal output terminal 61 and a second signal output terminal 62. The first signal output terminal 61 and the second signal output terminal 62 are respectively connected to control terminals of the first switch 70 and the second switch 80, for example, respectively connected to gates or bases of the corresponding MOSFETs or BJTs. In one embodiment, the controller 60 controls the first switch 70 and the second switch 80 to turn on or turn off as follows: the controller 60 outputs pulse width modulation (PWM) signals with a certain duty cycle to the first switch 70 or the second switch 80 via the first signal output terminal 61 and the second signal output terminal 62, thus turning on the first switch 70 or the second switch 80; the controller 60 stops outputting the PWM signals with a certain duty cycle to the first switch 70 or the second switch 80 via the first signal output terminal 61 and the second signal output terminal 62, thus turning off the first switch 70 or the second switch 80.

In one embodiment, the first light emitting element 30 is one of a full spectrum light-emitting diode (LED), a bicolor LED, or a LED having three primary colors. The second light emitting element 40 is LED having three primary colors.

In one embodiment, the electronic device 100 further includes a storage device 92. The storage device 92 stores a relationship table which records relationships between different preset events and different duty cycles. When the preset event is occurred, the controller 60 determines the duty cycle of the PWM signal corresponding to the occurred preset event according to the relationship table and outputs the PWM signal with the determined duty cycle to the second switch 80 to control the second switch 80 to turn on in a corresponding degree. Therefore, the power voltage provided by the power circuit 90 is provided to the second light emitting element 40 via the second switch 80 to turn on in the corresponding degree and causes a current flowing through the second light emitting element 40 to cause the second light emitting element 40 to generate light with a corresponding color. Therefore, when different preset events occur, the light emitting element 40 can generate light with different color. Therefore, the user can quickly determine which event is occurring according to the color of the light.

The relationship table can be generated by default or by the operations of the user.

The electronic device 100 can be a mobile phone, a tablet computer, an electronic reader, or the like.

The electronic device 100 also can include other components/elements, due to being unrelated to the present disclosure, the descriptions are omitted.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
   a glass cover plate;
   a first light emitting element setting at a non-display area of an inner surface of the glass cover plate;
   a second light emitting element setting at the non-display area; and
   a light guide device setting at the non-display area and being aligned to the first light emitting element and the second light emitting element;
   wherein, the glass cover plate comprises a decorative coating which is coated on a whole of the non-display area excepting a portion corresponding to the light guide device, the portion corresponding to the light guide device, of the non-display area forms a light transmission member;
   wherein, the light guide device comprises a light guide member and a reflective member, the light guide member comprising:
      a junction surface configured to adhere on the portion corresponding to the light guide device, of the non-display area of the inner surface of the glass cover plate, to fix the light guide device on the inner surface of the glass cover plate;
      a first light incident member, wherein the first light incident member is a surface which is at a first side of the light guide device and is perpendicular to the junction surface;
      a second light incident member, wherein the second light incident member is another surface which is at the first side of the light guide device and is slantwise relative to the junction surface;
      a contact surface paralleled to the junction surface, wherein a length of the contact surface is less than a length of the junction surface; and
      a reflective curved surface, wherein the reflective curved surface is an arc-shaped surface formed between an end of the contact surface and an end of the junction surface of a second side of the light guide device;
   wherein, the reflective member comprises a reflective surface adapted to the reflective curved surface and the contact surface of the light guide member;
   wherein, when the reflective member is fixed on the light guide member, the first light incident member and the second light incident member are not covered by the reflective member and are exposed, the first light incident member and the second light incident member are respectively aligned with the first light emitting element and the second light emitting element, and are respectively configured to receive light emitted by the first light emitting element and the second light emitting element, and guide the light emitted by the corresponding light emitting elements; and
   wherein, the electronic device further comprises a power circuit, a first switch, a second switch, a controller, and a front camera, the power circuit is configured to provide a power voltage, the first switch is connected between the first light emitting element and the power circuit, and is configured to establish or cut off a connection between the first light emitting element and the power circuit, the second switch is connected between the second light emitting element and the power circuit, and is configured to establish or cut off a connection between the second light emitting element and the power circuit, the controller is connected to the first switch and the second switch, and is configured to turn on or turn off the first switch and the second switch and to control the first switch to turn on only in response to an operation of turning on the front camera, when the first switch is turned on, the power circuit provides the power voltage to the first light emitting element to cause the first light emitting element to emit light, when the first light emitting element emits light, the light emitted by the first light emitting element is transmitted to the reflective curved surface of the light guide member via the first light incident member, and is reflected by a portion of the reflective member covering the reflective curved surface of the light guide member, and then is emitted out via the light transmission member of the glass cover plate as flash.

2. The electronic device according to claim 1, wherein a color of the reflective member is the same as a color of the decorative coating coated on the glass cover plate, and the whole reflective member is made of reflective material or one surface of the reflective member is coated with a reflective material coating.

3. The electronic device according to claim 1, wherein the reflective member further comprises two reflective sidewalls respectively adapted to two sidewalls of the light guide member, the two reflective sidewalls are configured to enhance a reflective effect of the reflective member.

4. The electronic device according to claim 1, wherein the controller is further configured to control the second switch to turn on only in response to an occurrence of an event, when the second switch is turned on, the power circuit provides the power voltage to the second light emitting element to cause the second light emitting element to emit light, when the second light emitting element emits light, the light emitted by the second light emitting element is refracted when passing through the second light incident member, and then is emitted out via the light transmission member of the glass cover plate to an upper surface of the glass cover plate, and then diffused in the glass cover plate via a total reflection mode to cause a luminous area of the glass cover plate to be formed and function as an indication signal.

5. The electronic device according to claim 4, wherein the controller comprises a first signal output terminal and a second signal output terminal respectively connected to controlled terminals of the first switch and the second switch, the controller outputs pulse width modulation (PWM) signals with certain duty cycle to the first switch or the second switch via the first signal output terminal or the second signal output terminal to turn on the first switch or the second switch; the controller stops outputting the PWM signals with certain duty cycle to the first switch or the second switch via the first signal output terminal or the second signal output terminal to turn off the first switch or the second switch.

6. The electronic device according to claim 5, further comprising a storage device, wherein the storage device stores a relationship table which records relationships between different preset events and different duty cycles, when the preset event is occurred, the controller determines the duty cycle of the PWM signal corresponding to the occurred preset event according to the relationship table, and outputs the PWM signal with the determined duty cycle to the second switch to control the second switch to turn on in a corresponding degree, thereby causing a corresponding current flowing through the second light emitting element to cause the second light emitting element to generate light with a corresponding color.

7. The electronic device according to claim 1, wherein the first light emitting element is a full spectrum light-emitting diode (LED), a bicolor LED, or a three primary colors LED; the second light emitting element is a three primary colors LED.

* * * * *